Patented Dec. 30, 1952

2,623,861

UNITED STATES PATENT OFFICE 2,623,861

PREPARATION OF ALUMINA-PLATINUM-HALOGEN CATALYST

Vladimir Haensel, Hinsdale, Ill., assignor to Universal Oil Products Company, Chicago, Ill., a corporation of Delaware No Drawing. Application July 8, 1949, Serial No. 103,745

8 Claims. (Cl. 252—442)

1

This invention relates to the manufacture and use of catalysts and more particularly to the manufacture and use of platinum-containing catalysts prepared by a specific method of procedure.

Platinum-containing catalysts and various methods of manufacture have heretofore been suggested. These catalysts have been of limited commercial acceptance because of the high cost thereof. The present invention is based on the discovery that exceptionally good catalysts may be prepared by the specfic methods of preparation to be hereinafter described in detail.

In one embodiment the present invention relates to a method of preparing a catalyst which comprises commingling with alumina a solution comprising a platinum compound, halogen and an amine.

In a specific embodiment the present invention relates to a method of preparing a catalyst which comprises commingling with a previously dried alumina particle a solution comprising chloroplatinic acid, hydrogen fluoride and an aliphatic amine.

In another specific embodiment the present invention relates to the conversion of hydrocarbons and particularly the reforming of gasoline in the presence of a catalyst prepared in the manner herein set forth.

It has been found that exceptionally good catalysts are prepared in accordance with the novel features of the present invention. While these catalysts may contain larger concentrations of platinum, which may range up to about 10% by weight or more of the alumina, it has been found that exceptionally good catalysts may be prepared to contain from as low as about 0.01% to about 1% by weight of platinum. The catalysts of these low platinum concentrations are particularly preferred in the present invention because of the considerably lower cost of the catalyst. It is well known that platinum is very expensive and any satisfactory method of reducing the amount of platinum required in catalysts considerably reduces the cost of the catalyst and thus enhances the attractiveness of the catalyst for use in commercial processes.

However, in order to obtain improved results with these low platinum concentrations, it is necessary that a particular type of supporting component be composited with the platinum. It has been found that alumina shows unexpected advantages for use as a supporting component for the low platinum concentration, apparently due to some peculiar association of the alumina with the platinum, either as a chemical combination or as a physical association.

To further improve these catalysts, it is an essential feature of the present invention that the final catalyst contains halogen in a specific concentration. It has been found that the presence of halogen within a specific range enhances the activity of the catalyst. It is believed that the halogen enters into a chemical combination or loose complex with the alumina and/or platinum, and thereby serves to further improve the final catalyst.

While any of the halogens will serve to effect improved results, the fluoride is preferred. Next in order is the chloride, while the bromide and iodide are generally less preferred. It is understood that, while all of these halogens will serve to effect an improvement, they are not necessarily equivalent.

As hereinbefore set forth, the catalyst of the present invention is prepared by a specific method of procedure. In this method, a solution comprising the platinum compound, halogen and an amine is prepared and this solution is commingled with alumina. By the use of the amine, a homogeneous solution is obtained which will readily penetrate and be uniformly distributed throughout the alumina, thereby resulting in an improved catalyst. In contrast to the use of an amine, it has been found that the addition of ammonium hydroxide to a chloroplatinic acid-hydrogen fluoride solution results in the settling out of ammonium chloroplatinate as an insoluble precipitate, and this further results in a heterogeneous mixture which cannot be utilized satisfactorily for commingling with the alumina to obtain uniform distribution of the platinum throughout the alumina. Catalysts containing a non-uniform distribution of the platinum are not satisfactory, apparently due to a peculiar association of platinum, halogen and alumina which is required to produce satisfactory catalysts. It appears that a particular spacial arrangement of the platinum and halogen in relation to the alumina and to each other is necessary in order to obtain satisfactory catalysts. This desired arrangement is not achieved when the platinum atoms are grouped too closely together or are spaced at too great a distance apart. In any event the use of an amine along with the hydrogen fluoride and chloroplatinic acid results in a solution which is satisfactory for use in compositing with the alumina.

The alumina for use in the present catalyst may be prepared in any suitable manner, a particularly preferred method is to add a suitable reagent, such as ammonium hydroxide, ammonium carbonate, etc. to a salt of aluminum, such as aluminum chloride, aluminum sulfate, aluminum nitrate, etc. in an amount to form aluminum hydroxide which upon drying is converted to alumina and, in the interest of simplicity, the aluminum hydroxide is referred to as alumina in the present specification and claims in order that the percentages are based on alumina free of combined water.

Alumina prepared in the above manner, after washing and filtration is generally recovered as a wet cake. In one embodiment of the invention the wet cake, either with or without being made into a slurry with water, is commingled with the platinum-halogen-amine solution. In another embodiment of the invention, the alumina may be dried, formed into particles of definite size and shape and calcined prior to commingling with the platinum-halogen-amine solution.

The solution of platinum compound, halogen and amine may be prepared in any suitable manner. Chloroplatinic acid is the preferred platinum compound to be used in accordance with the present invention because of its readily availability and lower cost. However, it is understood that any other platinum compound which undergoes undesirable formation of a solid precipitate upon the addition of a halogen and in the presence of ammonium hydroxide may be utilized in accordance with the present invention, and the difficulty of the formation of a solid precipitate is avoided by the use of the amine instead of ammonium hydroxide in the manner herein set forth. For example, when ammonium hydroxide is added to a solution of trimethylbenzyl ammonium platinum chloride containing hydrogen chloride, a solid precipitate settles out of solution. However, the use of diethylene triamine avoids this difficulty and results in a clear solution which is satisfactory for compositing with the alumina. As hereinbefore set forth, the amount of platinum compound utilized is preferably controlled so that the final catalyst contains from about 0.01% to about 1% by weight of platinum.

Any suitable halogen compound may be used as a source of the halogen in the catalyst of the present invention but should be in a form which will readily react with the alumina and also should not leave undesired deposits in the catalyst. A preferred method is to use the halogen in the form of an acid, such as hydrogen fluoride, hydrogen chloride, hydrogen bromide and/or hydrogen iodide. Hydrogen fluoride is preferably added as an aqueous solution for ease in handling and for control of the specific amount to be added. In another method, the halogen may be added as fluorine, chlorine, bromine or iodine but, in view of the fact that fluorine and chlorine normally exist as a gas, it is generally preferable to utilize them in the form of a solution for ease in handling.

The concentration of halogen in the finished catalyst will be within the range of from about 0.1% to about 8% by weight of the alumina on a dry basis. The fluoride appears to be more active and, therefore, will generally be used within the range of from about 0.1% to about 3% by weight of the alumina on a dry basis. The chloride will be used within the range of from about 0.1% to about 8% and preferably from about 0.3% to about 5% by weight of the alumina on a dry basis. It is understood that the halogen may comprise a mixture of halogens and preferably a mixture of the fluoride and chloride. It has been found that halogen concentrations below the lower limits herein specified do not give the desired improvements and, on the other hand, concentrations of halogen above the upper limit adversely affect the selectivity of the catalyst thus catalyzing side reactions to an extent greater than desired.

Any suitable amine may be used within the scope of the present invention. The preferred amines comprise aliphatic amines and particularly the alkylene polyamines including diethylene triamine, triethylene tetramine, etc. The amine preferably is readily soluble in aqueous solutions and preferably is normally liquid for ease in handling. Thus, methyl amine, dimethyl amine, etc. are generally not preferred for this reason. However, other suitable amines include propyl amine, butyl amine, amyl amine, hexyl amine, heptyl amine, octyl amine, diethyl amine, dipropyl amine, dibutyl amine, triethyl amine, etc. Generally, the aliphatic amines are preferred but it is understood that suitable aromatic amines may be employed including aniline, phenylene diamine, toluidine, xylidine, monomethylaniline, ethylaniline, dimethylaniline, methylene-diphenyldiamine, etc.

The amount of amine required will vary with the particular amine and with the particular solution utilized. In general, only a small amount of amine will be required and usually will be in an amount sufficient to raise the pH of the solution to above 5 and preferably above 7. As will be shown in the example to the present specification, only a very small amount of diethylene triamine was necessary to raise the pH of the solution to above 7.

The solution of platinum, halogen and amine may be prepared in any suitable manner. In one method the halogen solution may be commingled with the platinum solution and then the amine may be added. In another method the amine may be commingled with the platinum or halogen solution and then the other solution may be added.

The solution of platinum, halogen and amine may be composited with the alumina in any suitable manner. When the solution is to be composited with the alumina in a wet condition, this is readily accomplished by adding the solution to the alumina and thoroughly mixing the same to obtain uniform distribution, after which the composite is washed and the washed material is dried at a temperature of from about 200° to about 500° F. for a period of from about 2 to 24 hours or more. When particles of irregular size and shape are desired, the dried material may be ground and then calcined at a temperature of from about 700° to about 1100° F. for a period of from about 2 to 12 hours or more. On the other hand when particles of uniform size and shape are desired, a suitable lubricant such as stearic acid, rosin, hydrogenated coconut oil, graphite, etc. is added to the dried material and then it is formed into particles of uniform size and shape by any suitable method such as pelleting, extrusion, etc. The particles are then calcined at a temperature within the range as hereinbefore set forth.

In a preferred embodiment of the invention, the alumina prior to commingling with the other components is formed into particles of definite size and shape. This is accomplished in substantially the same manner as hereinbefore set forth but, before the platinum is composited with the alumina, the alumina particles may be calcined at a somewhat higher temperature which may range from about 800° to about 1400° F. Commingling of the platinum-halogen-amine solution with the alumina particles may be accomplished in any suitable manner, including soaking the alumina pills in the solution and either draining off the excess solution or heating to remove the volatilizable materials. Another suitable method is by dipping the alumina particles in the solution. In any event the alumina is contacted with the solution for a sufficient period of time to obtain uniform distribution of the solution throughout the alumina, after which the composite may be dried at a temperature of from about 200° to about 500° F. for a period of from about 2 to 24 hours or more and then calcined at a temperature from about 700° to about 1100° F. for a period of from about 2 to 12 hours or more. The calcination is preferably effected in the presence of air or other oxygen containing gas. In another embodiment of the invention the calcination may comprise a two stage method in which it is first conducted in the presence of hydrogen and then followed by calcination in air, or the reverse procedure may be employed. In some cases the reduction with hydrogen or hydrogen-containing gas may be effected at a lower temperature within the range of from about 300° to about 600° F.

In some cases the lubricant will be removed during the high temperature heating. In other cases as, for example, when graphite is used as the lubricant, the separate high temperature heating step may be omitted, and the effective heat treatment of the catalyst may be obtained in the plant before or during processing of the hydrocarbon.

Although the catalyst of the present invention will have a long life, it may be necessary to regenerate the catalyst after long periods of service. The regeneration may be effected by treatment with air or other oxygen-containing gas to burn carbonaceous deposits therefrom. In general, it is preferred to control the regeneration temperature not to exceed about 1100° F. In some cases it may be desirable to follow the burning operation with treatment with hydrogen-containing gas at temperatures of from about 700° to about 1100° F.

The improved catalyst of the present invention may be employed in any process for which platinum is a catalyst. The improved catalyst is particularly satisfactory for reforming operations in which a saturated gasoline, such as straight run gasoline, natural gasoline, etc. is subjected to conversion to produce a reformed gasoline of improved anti-knock properties. Saturated gasoline generally comprises a mixture of naphthenic and paraffinic hydrocarbons, and the reforming operation effects dehydrogenation of the naphthenic hydrocarbons to aromatics, cyclization of the paraffinic hydrocarbons to aromatics, as well as to effect a controlled type of cracking which is selective both in quality and in quantity. In addition, other reactions may occur such as isomerization, hydrogen transfer, etc. The controlled or selective cracking is desirable because it further increases the octane number of the reformed gasoline, produces a gasoline of higher volatility and converts higher boiling fractions to lower boiling fractions within the range of gasoline. However, this cracking must be controlled because excessive cracking produces excessive normally gaseous products and also excessive carbonaceous deposits on and deactivation of the catalyst. The improved catalysts of the present invention are particularly desirable for reforming operations because the catalyst effects the desired aromatization and controlled cracking under selected conditions of operation.

It is understood that the gasoline may comprise a full boiling range gasoline or any selected fraction thereof, and reference to gasoline in the present specification and claims shall mean the full boiling range gasoline or any selected fraction thereof.

The catalyst of the present invention may also find utility in treatment of higher boiling saturated fractions such as kerosene, gas oil, etc. In many cases it is desirable to produce from kerosene a highly aromatic product useful as a solvent, and the present invention is readily applicable for this purpose. The gasoline, kerosene, etc. fractions comprise a mixture of different hydrocarbons and, in accordance with the invention, the full boiling range fraction or any selected fraction thereof may be subjected to the desired conversion. When a selected fraction is so treated, it may be blended, all or in part, with the other fraction or fractions.

The catalyst of the present invention may prove particularly useful for destructive hydrogenation or hydrocracking reactions in which hydrocarbons and particularly oil heavier than gasoline are subjected to conversion to produce lower boiling products and particularly gasoline. For cracking reactions, it is preferred that the halogen content of the catalyst be within the upper limits of the ranges hereinbefore set forth because these higher halogen catalysts are more active for effecting decomposition reactions.

The catalyst of the present invention may also be useful for effecting non-destructive hydrogenation reactions including the hydrogenation of unsaturated aliphatic hydrocarbons, such as mono-olefins, di-olefins, etc., to form the corresponding saturated hydrocarbons, hydrogenation of unsaturated cyclic hydrocarbons, hydrogenation of unsaturated alcohols, ketones, acids, etc. Other reactions in which these catalysts may find utility include oxidation as, for example, oxidation of olefins to form the corresponding oxide, such as the oxidation of ethylene to ethylene oxide, propylene to propylene oxide, etc., oxidation of alcohols, ketones, etc. These and other oxidation reactions are well known in the art, and it is within the scope of the present invention to effect these reactions in the presence of these catalysts. In reactions involving hydrogenation, oxidation or condensation, it is preferred that the halogen content of the catalyst be within the lower limits of the ranges hereinbefore specified in order to minimize side reactions.

As hereinbefore set forth, selected processing conditions are required depending upon the particular reaction desired. For reforming of straight run gasoline the temperature employed should be within the range of from about 600° to about 1000° F., the pressure within the range of from about 50 to about 1000 pounds per square inch and the weight hourly space velocity within the range of from about 0.5 to about 10. For dehydrogenation of normal butane the temperature should be within the range of from about 800° to about 1100° F., the pressure from about atmospheric to about 50 pounds per square inch and the gaseous hourly space velocity from about 200 to about 5000. For hydrogenation reactions the temperature may range from atmospheric to about 500° F., the pressure from about 100 to about 3000 pounds or more, and the weight hourly space velocity from about 0.5 to 5. The weight hourly space velocity is defined as the weight of oil per hour per weight of catalyst in the reaction zone.

In one embodiment of the process, sufficient hydrogen will be produced in the reforming reaction to furnish the hydrogen required in the process and, therefore, it may be unnecessary to either introduce hydrogen from an extraneous source or to recycle hydrogen within the process. However, it usually will be preferred to introduce hydrogen from an extraneous source, generally at the beginning of the operation, and to recycle hydrogen within the process in order to be assured of a sufficient hydrogen atmosphere in the reaction zone. In some cases the gas to be recycled will contain hydrogen sulfide, introduced with the charge or liberated from the catalyst, and it is within the scope of the present invention to treat the hydrogen containing gas to remove hydrogen sulfide or other impurities before recycling the hydrogen within the process.

The process of the present invention may be effected in any suitable equipment. A particularly suitable process comprises the well known fixed bed system in which the catalyst is disposed in a reaction zone and the hydrocarbons to be treated are passed therethrough in either upward or downward flow. The products are fractionated to separate hydrogen and to recover the desired products. As hereinbefore set forth, the hydrogen may be recycled for further use in the process. Other suitable units in which the process may be effected include the fluidized type process in which the hydrocarbons and catalysts are maintained in a state of turbulence under hindered settling conditions in a reaction zone, the compact moving bed type in which the catalyst and hydrocarbons are passed either concurrently or countercurrently to each other, the suspensoid type of operation in which the catalyst is carried into the reaction zone as a slurry in the hydrocarbon oil, and the fluidized-fixed bed type of process in which the reaction is effected in substantially the same manner as described for the fluidized type process except that the catalyst is substantially retained in the reaction zone.

The following example is introduced to illustrate further the novelty and utility of the present invention, but not with the intention of unduly limiting the same.

A catalyst comprising alumina, 0.3% by weight of platinum and 0.3% by weight of combined fluoride was prepared by adding ammonium hydroxide to aluminum chloride hexahydrate. The resultant aluminum hydroxide was washed thoroughly in six separate washes with large amounts of water containing a small amount of ammonium hydroxide and then was given a final wash with water. The alumina was filtered after each wash, and the final wet cake was dried at a temperature of about 340° F. for about 9 hours, ground, Sterotex added as a lubricant, and the alumina was formed into pills of uniform size and shape. The Sterotex was burned out at a temperature of 932° F. for about 2 hours and then the alumina was calcined at a temperature of about 1200° F. for 3 hours.

A separate solution of chloroplatinic acid, hydrogen fluoride and diethylene triamine was prepared and this solution was commingled with the alumina pills in an amount to form a final catalyst containing 0.3% by weight of combined fluorine and 0.3% by weight of platinum. The composite was dried at a temperature of 212° F. and finally calcined at a temperature of 932° F. for a period of 3 hours.

The amount of diethylene triamine used was 1 cc. per 3.3 grams of a hydrogen fluoride solution containing 4.8% by weight of hydrogen fluoride and 10 cc. of an aqueous chloroplatinic acid solution containing 0.434 grams of chloroplatinic acid. This amount of diethylene triamine raised the pH of the solution to 9.7.

The catalyst as prepared in the above manner was utilized for the reforming of a Mid-Continent naphtha having an initial boiling point of 182°, and end boiling point of 402° F., an A. S. T. M. Motor Method Octane Number of 34.6, a Research Method Octane Number of 34.8 and 6.7% by weight of aromatics. The reforming was effected at a temperature of about 850° F., a pressure of 500 pounds per square inch, a space velocity of 2 and a hydrogen to hydrocarbon ratio of 3 to 1. There was produced 91.3% by volume of a reformate having an A. S. T. M. Motor Method Octane Number of 79.2, a Research Method Octane Number of 87.9 and containing 49.4% by weight of aromatics. It will be noted that the catalyst prepared in accordance with the present invention produced a high yield of a high octane number reformed gasoline.

In contrast to the very satisfactory catalyst produced in the above manner, a catalyst preparation was attempted in which a solution of chloroplatinic acid, hydrogen fluoride and ammonium hydroxide was prepared. An attempt to prepare satisfactory catalysts from such a mixture was very unsatisfactory because the resulting composite contained an uneven distribution of the platinum and mostly comprised a surface coating on the alumina. The composite was not satisfactory as a catalyst for the process as herein set forth.

I claim as my invention:

1. A method of preparing a catalyst which comprises commingling with precipitated alumina a solution containing chloroplatinic acid, hydrogen fluoride and a water-soluble aliphatic amine in sufficient amount to raise the pH of the solution to above 5 and to thereby stabilize the solution, said chloroplatinic acid being in an amount to form a final catalyst containing from about 0.01% to about 1% by weight of platinum and said hydrogen fluoride being in an amount to form a final catalyst containing from about 0.1% to about 8% by weight of combined fluorine, and calcining the thus treated alumina.

2. A method of preparing a catalyst which comprises commingling with dry precipitated alumina particles of definite size and shape a solution containing chloroplatinic acid, hydrogen fluoride and a water-soluble alkylene polyamine in sufficient amount to raise the pH of the solution to above 5 and to thereby stabilize the solution, said chloroplatinic acid being in an amount to form a final catalyst containing from about 0.01% to about 1% by weight of platinum and said hydrogen fluoride being in an amount to form a final catalyst containing from about 0.1% to about 3% by weight of combined fluorine, and calcining the thus treated alumina particles.

3. A method of preparing a catalyst which comprises impregnating alumina with a solution containing a water-soluble platinum compound, a water-soluble halogen compound and a sufficient amount of a water-soluble amine to raise the pH of the solution to above 5 and to thereby stabilize the solution, said platinum compound and said halogen compound being in amounts to form a final catalyst containing from about 0.01% to about 1% by weight of platinum and from about 0.1% to about 8% by weight combined halogen, and calcining the thus impregnated alumina.

4. A method of preparing a catalyst which comprises impregnating alumina with a solution containing chloroplatinic acid, hydrogen fluoride and a sufficient amount of a water-soluble amine to raise the pH of the solution to above 5 and to thereby stabilize the solution, the chloroplatinic acid and hydrogen fluoride being in amounts to form a final catalyst containing from about 0.01% to about 1% by weight of platinum and from about 0.1% to about 8% by weight combined fluorine, and calcining the thus impregnated alumina.

5. A method of preparing a catalyst which comprises impregnating a dry precipitated alumina with a solution containing a water-soluble platinum compound, a water-soluble halogen compound and a sufficient amount of a water-soluble aliphatic amine to raise the pH of the solution to above 5 and to thereby stabilize the solution, said platinum compound and said halogen compound being in amounts to form a final catalyst containing from about 0.01% to about 1% by weight of platinum and from about 0.1% to about 8% by weight combined halogen, and calcining the thus impregnated alumina.

6. A method of preparing a catalyst which comprises impregnating shaped particles of precipitated alumina wih a solution containing a water-soluble platinum compound, a water-soluble halogen compound and a sufficient amount of a water-soluble alkylene polyamine to raise the pH of the solution to above 5 and to thereby stabilize the solution, said platinum compound and said halogen compound being in amounts to form a final catalyst containing from about 0.01% to about 1% by weight of platinum and from about 0.1% to about 8% by weight combined halogen, and calcining the thus impregnated alumina.

7. The method of claim 3 further characterized in that said amine is an alkylene polyamine.

8. The method of claim 3 further characterized in that said amine is diethylene triamine.

VLADIMIR HAENSEL.

REFERENCES CITED

The following references are of record in the file of this patent:

UNITED STATES PATENTS

| Number | Name | Date |
|---|---|---|
| 2,005,412 | Connolly et al. | June 18, 1935 |
| 2,200,522 | Streicher | May 14, 1940 |
| 2,400,012 | Littmann | May 7, 1946 |
| 2,479,109 | Haensel | Aug. 16, 1949 |
| 2,479,110 | Haensel | Aug. 16, 1949 |